US010225045B2

(12) United States Patent
Dropps et al.

(10) Patent No.: US 10,225,045 B2
(45) Date of Patent: Mar. 5, 2019

(54) PACKET-BASED ADAPTIVE FORWARD ERROR CORRECTION

(71) Applicant: HEWLETT PACKARD ENTERPRISE DEVELOPMENT LP, Houston, TX (US)

(72) Inventors: Frank R. Dropps, Maple Grove, MN (US); Mark R. Sikkink, Chippewa Falls, WI (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/427,941

(22) Filed: Feb. 8, 2017

(65) Prior Publication Data

US 2018/0227078 A1 Aug. 9, 2018

(51) Int. Cl.
*H04L 1/18* (2006.01)
*H04L 1/00* (2006.01)
*H04L 12/721* (2013.01)

(52) U.S. Cl.
CPC .......... *H04L 1/0042* (2013.01); *H04L 1/0058* (2013.01); *H04L 45/72* (2013.01)

(58) Field of Classification Search
CPC ...... H04L 1/0042; H04L 1/0058; H04L 45/72
See application file for complete search history.

(56) References Cited

U.S. PATENT DOCUMENTS 6,128,763 A 10/2000 LoGalbo et al. ............. 714/774
7,079,523 B2 * 7/2006 Nelson, Jr. ........ H04W 56/0085 370/342
7,096,400 B2 * 8/2006 Lim ...................... H04L 1/0009 714/748
7,224,702 B2 * 5/2007 Lee ....................... H04L 1/1809 370/473
7,376,880 B2 * 5/2008 Ichiki ................ H03M 13/2707 714/751
7,733,911 B2 * 6/2010 Lee ....................... H04L 1/1809 370/473
8,091,011 B2 1/2012 Rajakarunanayake et al. ............ 714/774
8,693,413 B2 * 4/2014 Kanazawa ............ H04L 1/0026 370/329
9,113,311 B2 * 8/2015 Kotecha .................. H04W 4/06
9,246,631 B2 * 1/2016 Sugiura ................. H04L 65/602

* cited by examiner

*Primary Examiner* — Esaw T Abraham

(74) *Attorney, Agent, or Firm* — Michael A. Dryja

(57) ABSTRACT

A system, method, and storage medium provide dynamic, packet-based adaptive forward error correction over a lossy bidirectional data communication medium that couples a transmitting device to a receiving device. The transmitting device repeatedly transmits encoded data packets formed by applying, to unencoded data, a forward error correction (FEC) algorithm having a level N that indicates a number of correctable errors. The receiving device attempts to decode the encoded data packets using the FEC algorithm, requesting retransmission of a packet if there are too many errors to correct. The transmitting device decreases the level N when it does not receive such a request within a given duration. By contrast, the transmitting device increases the level N when it receives a sequence of such requests having a threshold length, each request being received less than the given duration after the previous request.

21 Claims, 5 Drawing Sheets

PACKET-BASED ADAPTIVE FORWARD ERROR CORRECTION

FIELD OF THE INVENTION

The invention relates generally to transmission of digital information in high performance computing systems and, more particularly, to error protection by dynamically adapting a data encoding according to a change of transmission characteristics of a communication channel between nodes of a high performance computing system.

BACKGROUND OF THE INVENTION

Systems that communicate data using electromagnetic signals suffer from communication errors due to interference or noise. Interference often is produced by uncontrolled electromagnetic sources, while noise comes in many forms, including the random motion of electrons in the communication medium due to their thermal energy. Regardless the source of the errors, information that is transmitted often is not the same as the information received. Moreover, as the data rate of communications channels increases, they become less reliable due to these errors.

One technique developed to correct these communication errors is forward error correction, or "FEC", also called channel coding. FEC works by having the transmitting device send redundant data, which the receiving device uses to correct errors. When data are sent continuously, for example as a stream of bits, FEC uses a "convolutional code" to determine the redundant data. Convolutional codes generate a parity bit by applying a carefully chosen binary polynomial to a sliding window of bits within a data stream. A recursive encoder adds the parity bit back to the data stream itself, while a non-recursive encoder provides the stream of parity data "out of band." Such data streams may be decoded using the Viterbi algorithm, which is cost effective to implement in hardware due to the serial nature of the data processing.

When the data are sent in discrete groups, such as packets, then a "block code" is used. Block codes convert input messages having a fixed length (commonly called "k") into code words having a longer length ("n"). The code words are carefully chosen so that when compared pairwise, they differ in at least a minimum number of positions; this number is the distance ("d"). Such codes can detect (d−1) errors, and can correct up to (d−1)/2 errors, rounded down. Well known block codes include Reed-Solomon codes, Golay codes, BCH codes, Hamming codes, and low-density parity-check (LDPC) codes.

Because redundant data are transmitted, FEC decreases the useful bandwidth of the communication medium. Therefore, there is a need to minimize the amount of redundant data to transmit. However, the amount of error between the transmitting device and the receiving device may change over time, so it is beneficial if the amount of redundant data similarly changes over time. It is known in the art to perform dynamic FEC on a stream of bits using a convolutional or Viterbi encoder and decoder; for example, see U.S. Pat. No. 6,128763 to LoGalbo et al. It is also known in the art to perform static (i.e., "on-or-off") FEC at the block level; for example, see Institute of Electrical and Electronics Engineers (IEEE) Standard for 10 gigabit Ethernet over twisted pair cables, IEEE 802.3an-2006, available at http://standards.ieee.org/about/get/802/802.3.html, which describes the use of an LDPC code. However, there remains a need to perform adaptive FEC at the packet level, rather than the bit level. For example, high performance computing (HPC) systems often send packets over very high speed data interconnects that are particularly susceptible to communication errors.

SUMMARY OF VARIOUS EMBODIMENTS

Various embodiments of the invention provide dynamic, packet-based adaptive forward error correction over a lossy bidirectional data communication medium that couples a transmitting device to a receiving device. Generally speaking, the logic of such embodiments operates in the transmitting device, rather than the receiving device. The transmitter determines a "packet error rate", analogous to the bit error rate known in the art, and adjusts the FEC level accordingly. Thus, if the packet error rate is too high, the FEC level is increased so the receiver can decode more packets. However, if the FEC level remains high but the packet error rate drops, then bandwidth is being wasted by unnecessary FEC overhead, so the FEC level is decreased. As these balancing processes occur continuously, the FEC level is dynamically adapted to the condition of the communication medium.

A system embodiment of the invention includes a data communication medium, and coupled transmitting and receiving devices. The transmitting device applies, to unencoded data, a forward error correction (FEC) algorithm having a level N that indicates a number of correctable errors, to thereby form an encoded data packet. The transmitting device transmits the encoded data packet toward the receiving device using the data communication medium. The transmitting device determines to use, for subsequent application to unencoded data, an FEC algorithm having a decreased level N, when the transmitting device does not receive a request to retransmit a previously transmitted encoded data packet within a given duration from the receiving device using the data communication medium. The transmitting device also determines to use, for subsequent application to unencoded data, an FEC algorithm having an increased level N, when the transmitting device receives a sequence of requests to retransmit previously transmitted encoded data packets, each request in the sequence being received less than the given duration after the previous request in the sequence, the sequence having a length that exceeds a given threshold length. The transmitting device performs these processes repeatedly, for a plurality of encoded data packets.

The receiving device receives each encoded data packet, from the transmitting device using the data communication medium. When the encoded data packet contains no more than N errors, the receiving device recovers the unencoded data by applying the FEC algorithm to the received, encoded data packet. However, when the encoded data packet contains more than N errors, the receiving device sends a request to retransmit the packet, toward the transmitting device using the data communication medium.

Variations of the above system are contemplated. In one variant, the transmitting device comprises a first computing node in a high performance computing system, the receiving device comprises a second computing node in the high performance computing system, and the first computing node and second computing node are configured to cooperate to perform a computation by communicating packets of data using the data communication medium. In another variant, the transmitting device is further configured to specify the level N in a header of each data packet. The level N may have a minimum of zero and a given maximum. In still another variant, the transmitting device is further configured to retransmit the given packet in response to receiving the request to retransmit the encoded data packet in response to receiving the request to retransmit the encoded data packet. In another variant, the transmitting device is further configured to determine the given duration, the given threshold, or both, so that a number of bits per second of encoded data packets to be transmitted using the FEC algorithm is less than or equal to a number of bits per second of packets to be retransmitted in response to receiving requests to retransmit such encoded data packets using the FEC algorithm. In an additional variant, the transmitting device is further configured to alter the given duration, the given threshold, or both, when the transmitting device is rapidly alternating between using two FEC algorithms having different levels.

A method embodiment of the invention provides packet-based adaptive forward error correction over a lossy bidirectional data communication medium that couples a transmitting device to a receiving device. The method includes repeatedly performing a sequence of processes. The first process is transmitting, by the transmitting device toward the receiving device using the data communication medium for subsequent decoding by the receiving device, an encoded data packet formed by applying, to unencoded data, a forward error correction (FEC) algorithm having a level N that indicates a number of correctable errors. The second process is determining to use, by the transmitting device for subsequent application to unencoded data, an FEC algorithm having a decreased level N, when the transmitting device does not receive, within a given duration from the receiving device using the data communication medium, a request to retransmit a previously transmitted encoded data packet. The third process is determining to use, by the transmitting device for subsequent application to unencoded data, an FEC algorithm having an increased level N, when the transmitting device receives a sequence of requests to retransmit previously transmitted packets, each request in the sequence being received less than the given duration after the previous request in the sequence, the sequence having a length that exceeds a given threshold.

Variations of the basic method are contemplated in the same manner as for the system embodiment described above. Also contemplated is a tangible storage medium embodiment having non-transitorily stored program code that, when executed by a computer processor in a transmitting device, causes the transmitting device to perform the basic method, and variations of the storage medium in likewise manner.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

DESCRIPTION OF ILLUSTRATIVE EMBODIMENTS

Figure 1:
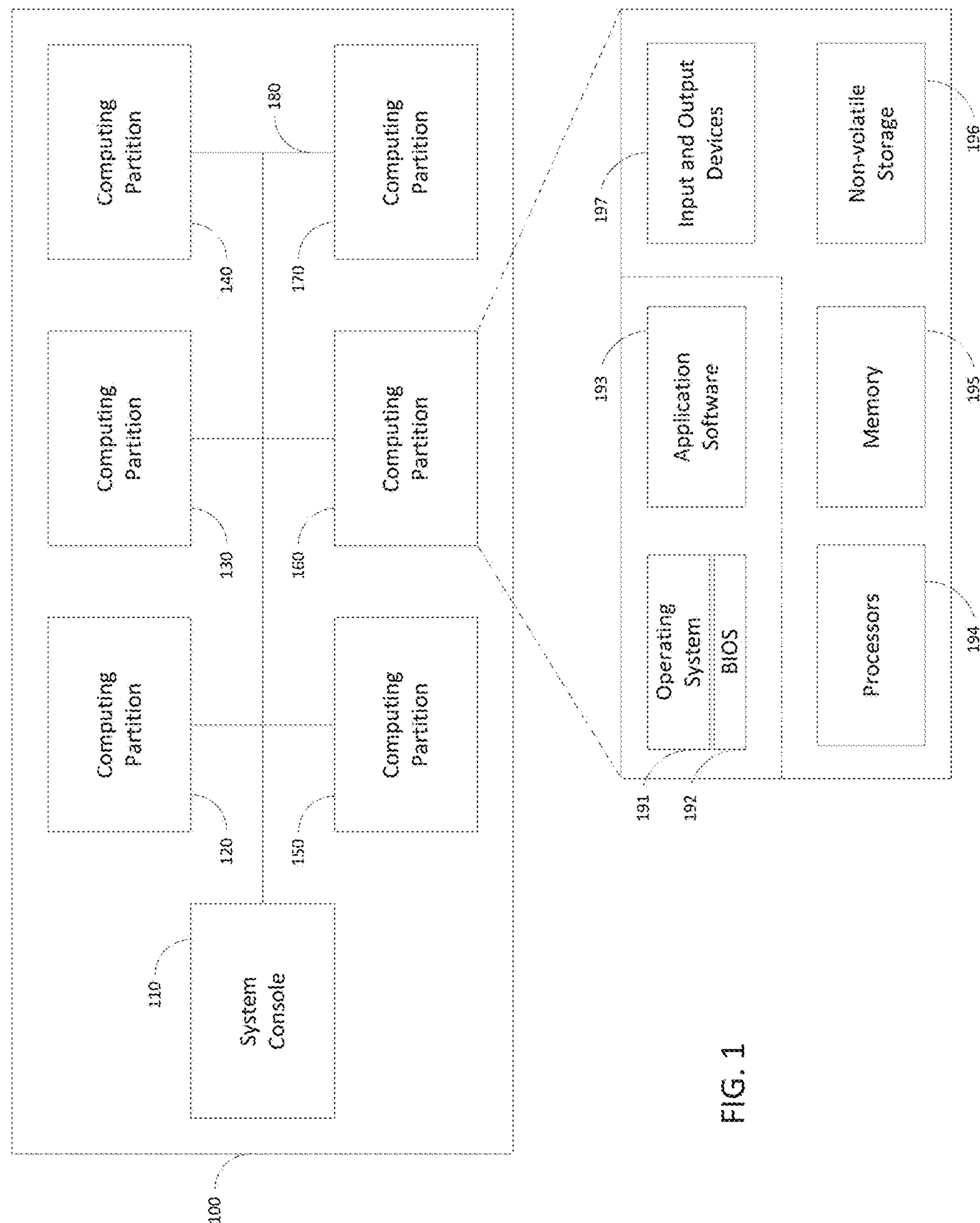
FIG. 1 schematically shows a logical view of an HPC system in accordance with one embodiment of the present invention.

Various embodiments of the invention provide dynamic, packet-based adaptive forward error correction over a lossy bidirectional data communication medium that couples a transmitting device to a receiving device. Generally speaking, the logic of such embodiments operates in the transmitting device, rather than the receiving device. The transmitter determines a "packet error rate", analogous to the bit error rate known in the art, and adjusts the FEC level accordingly. Thus, if the packet error rate is too high, the FEC level is increased so the receiver can decode more packets. However, if the FEC level remains high but the packet error rate drops, then bandwidth is being wasted by unnecessary FEC overhead, so the FEC level is decreased. As these balancing processes occur continuously, the FEC level is dynamically adapted to the condition of the communication medium.

Details of these and other embodiments are discussed below.

Definitions

As used in this description and the accompanying claims, the following terms shall have the meanings indicated, unless the context otherwise requires:

A "computation" is a physical transformation of input data to output data according to a well-defined model (such as an algorithm). A "computer" or "computer system" is any manufactured device or mechanism that is capable of performing a computation. A "computing process" is any process used by a computer to perform a computation.

A "computing resource" is any portion of a computer that may be used to carry out a computing process. Where the context is clear, "computing resource" also refers to an allocation, for a limited duration, of such a portion of a computer (i.e. time may be treated as a computing resource).

A "computing processor" is a computing resource that physically transforms input data to output data, and is programmable to perform different computations by executing a sequence of instructions called a "program". An "executing process" is a collection of computing resources associated with the execution, by one or more computing processors, of a particularly specified program. The sequence of instructions of a program may be divided into one or more "threads of execution" (or "threads"). A computer that contains a plurality of computing processors is a "multiprocessor computer".

A "memory" is a computing resource that stores data for use in a computing process. A memory, or portion thereof, is "shared" when it is simultaneously accessible by a plurality of programs, or by a plurality of threads, for use in performing the respective sequences of instructions thereof. To maintain a coherent state of a shared memory (that is, to ensure that changes made by one program or thread are seen by all others), a computer system may use a set of rules for accessing the memory called a "data consistency model", and implement them using a "memory coherence protocol".

Multiprocessor computer systems often include memory that is shared between the computing processors. Access to a shared memory in a multiprocessor computer system is called "uniform memory access" or "UMA" (respectively, "non-uniform memory access" or "NUMA") when the time required to complete such access does not depend (respectively, does depend) on which computing processor requested the access.

A computer, or portion thereof, engages in "concurrent computing" when it performs a plurality of simultaneous computations. A single computer may engage in concurrent computing by dividing the times for executing threads on a computing processor into slots, and scheduling the threads of two different programs for execution in consecutive time slots so that both computations are performed simultaneously.

A computer engages in "parallel computing" when a plurality of its computing resources simultaneously cooperate to perform a single computing process, in which case the single computing process is a "parallel (computing) process". To provide each computing resource with a process to perform, the parallel process is divided into subprocesses, and each of the plurality of computing resources is allocated to carry out one of the subprocesses. Parallel computing may be equated to concurrent computing to the extent that each such subprocess is treated as a separate computation.

When a parallel process has a plurality of transformations of data that may be independently performed, it has "functional parallelism" and may be divided into subprocesses that each perform a different transformation on the data. When the parallel process operates on a plurality of data that undergo the same transformation, it has "data parallelism" and may be divided into subprocesses that each perform the transformation on different data. A parallel process may have both functional parallelism and data parallelism.

A plurality of computers engages in "distributed computing" when the plurality collectively performs a single computation, in which case the plurality is a "distributed computing system" and the computation is a "distributed computation". A distributed computing system engages in parallel computing, in that collective performance of the distributed computation requires a parallel computing process that is divided among the collective computing resources of the distributed computing system. Moreover, a distributed computing system engages in concurrent computing, in that the divided subprocesses (when viewed as separate computations) are performed simultaneously on different computing resources of the overall distributed computing system.

A "high-performance computing system," or "HPC system," is a multiprocessor computing system with shared, coherent memory having non-uniform memory access and a common memory address space, and includes computing resources that are tightly coupled using hardware interconnects between a plurality of modular units.

System Architecture

FIG. 1 schematically shows a logical view of an exemplary high-performance computing (HPC) system 100 that may be used with illustrative embodiments of the present invention. The HPC system 100 includes a number of logical computing partitions 120, 130, 140, 150, 160, 170 for providing computational resources, and a system console 110 for managing the plurality of partitions 120-170. A "computing partition" (or "partition") in an HPC system is an administrative allocation of computational resources that runs a single operating system instance and has a common memory address space. Partitions 120-170 may communicate with the system console 110 using a logical communication network 180. A system user, such as a scientist or engineer who desires to perform a calculation, may request computational resources from a system operator, who uses the system console 110 to allocate and manage those resources. Allocation of computational resources to partitions is described below. The HPC system 100 may have any number of computing partitions that are administratively assigned as described in more detail below, and often has only one partition that encompasses all of the available computing resources. Accordingly, this figure should not be seen as limiting the scope of the invention.

Each computing partition, such as partition 160, may be viewed logically as if it were a single computing device, akin to a desktop computer. Thus, the partition 160 may execute software, including a single operating system ("OS") instance 191 that uses a basic input/output system ("BIOS") 192 as these are used together in the art, and application software 193 for one or more system users.

Accordingly, as also shown in FIG. 1, a computing partition has various hardware allocated to it by a system operator, including one or more processors 194, volatile memory 195, non-volatile storage 196, and input and output ("I/O") devices 197 (e.g., network ports, video display devices, keyboards, and the like). However, in HPC systems like the embodiment in FIG. 1, each computing partition has a great deal more processing power and memory than a typical desktop computer. The OS software may include, for example, a Windows® operating system by Microsoft Corporation of Redmond, Washington, or a Linux operating system. Moreover, although the BIOS may be provided as firmware by a hardware manufacturer, such as Intel Corporation of Santa Clara, Calif., it is typically customized according to the needs of the HPC system designer to support high-performance computing, as described below in more detail.

As part of its system management role, the system console 110 acts as an interface between the computing capabilities of the computing partitions 120-170 and the system operator or other computing systems. To that end, the system console 110 issues commands to the HPC system hardware and software on behalf of the system operator that permit, among other things: 1) booting the hardware, 2) dividing the system computing resources into computing partitions, 3) initializing the partitions, 4) monitoring the health of each partition and any hardware or software errors generated therein, 5) distributing operating systems and application software to the various partitions, 6) causing the operating systems and software to execute, 7) backing up the state of the partition or software therein, 8) shutting down application software, and 9) shutting down a computing partition or the entire HPC system 100. These particular functions are described in more detail in the section below entitled "System Operation."

Figure 2:
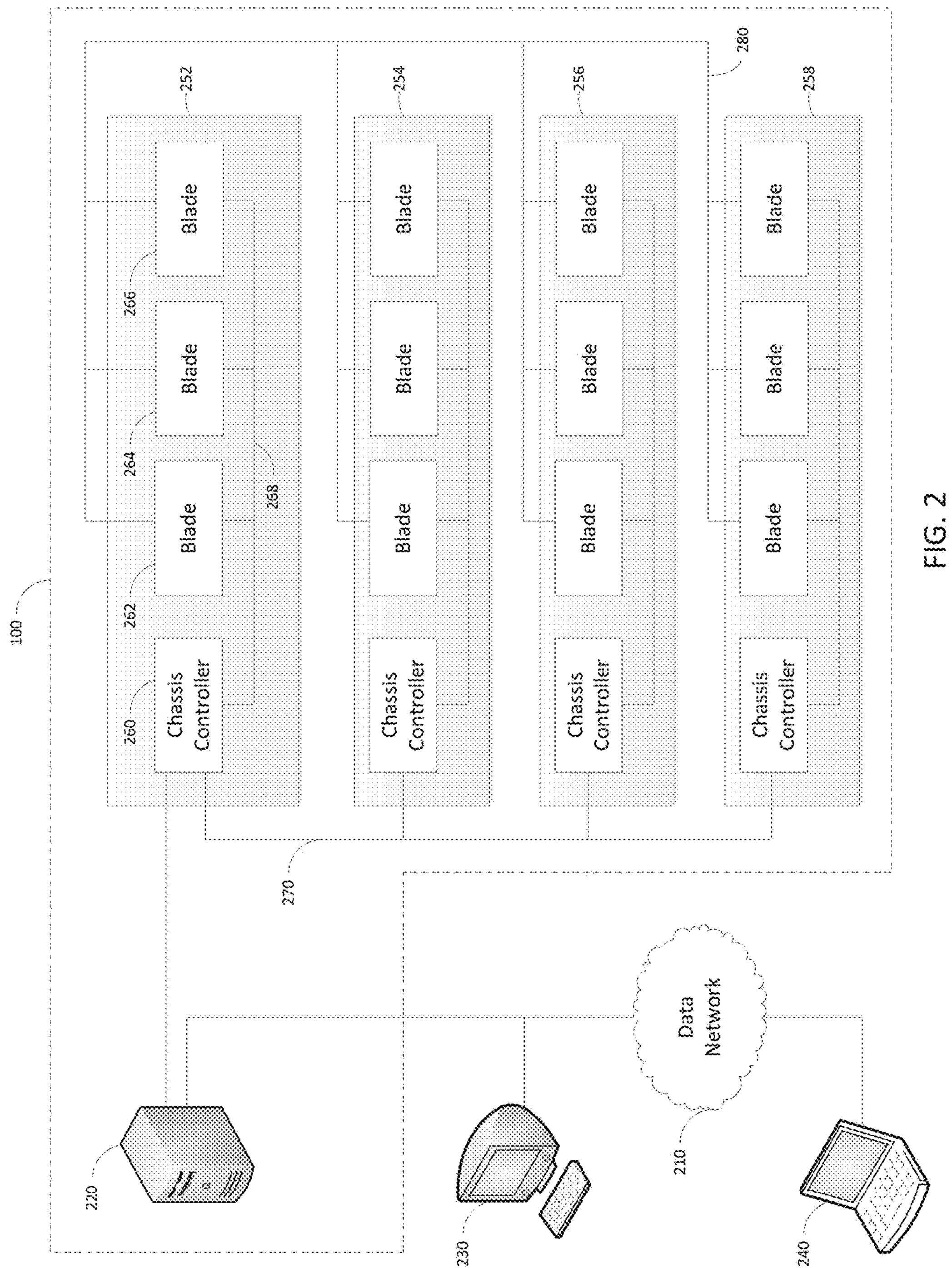
FIG. 2 schematically shows a physical view of the HPC system of FIG. 1.

FIG. 2 schematically shows a physical view of a high performance computing system 100 in accordance with the embodiment of FIG. 1. The hardware that comprises the HPC system 100 of FIG. 1 is surrounded by the dashed line. The HPC system 100 is connected to a customer data network 210 to facilitate customer access.

The HPC system 100 includes a system management node ("SMN") 220 that performs the functions of the system console 110. The management node 220 may be implemented as a desktop computer, a server computer, or other similar computing device, provided either by the customer or the HPC system designer, and includes software necessary to control the HPC system 100 (i.e., the system console software).

The HPC system 100 is accessible using the data network 210, which may include any data network known in the art, such as a customer local area network ("LAN"), a virtual private network ("VPN"), the Internet, or the like, or a combination of these networks. Any of these networks may permit a number of users to access the HPC system resources remotely and/or simultaneously. For example, the management node 220 may be accessed by a customer computer 230 by way of remote login using tools known in the art such as Windows® Remote Desktop Services or the UNIX secure shell. If the customer is so inclined, access to the HPC system 100 may be provided to a remote computer 240. The remote computer 240 may access the HPC system by way of a login to the management node 220 as just described, or using a gateway or proxy system as is known to persons in the art.

The hardware computing resources of the HPC system 100 (e.g., the processors, memory, non-volatile storage, and I/O devices shown in FIG. 1) are provided collectively by one or more "blade chassis," such as blade chassis 252, 254, 256, 258 shown in FIG. 2, that are managed and allocated into computing partitions. A blade chassis is an electronic chassis that is configured to house, power, and provide high-speed data communications between a plurality of stackable, modular electronic circuit boards called "blades." Each blade includes enough computing hardware to act as a standalone computing server. The modular design of a blade chassis permits the blades to be connected to power and data lines with a minimum of cabling and vertical space.

Accordingly, each blade chassis, for example blade chassis 252, has a chassis management controller 260 (also referred to as a "chassis controller" or "CMC") for managing system functions in the blade chassis 252, and a number of blades 262, 264, 266 for providing computing resources. Each blade, for example blade 262, contributes its hardware computing resources to the collective total resources of the HPC system 100. The system management node 220 manages the hardware computing resources of the entire HPC system 100 using the chassis controllers, such as chassis controller 260, while each chassis controller in turn manages the resources for just the blades in its blade chassis. The chassis controller 260 is physically and electrically coupled to the blades 262-266 inside the blade chassis 252 by means of a local management bus 268, described below in more detail. The hardware in the other blade chassis 254-258 is similarly configured.

The chassis controllers communicate with each other using a management connection 270. The management connection 270 may be a high-speed LAN, for example, running an Ethernet communication protocol, or other data bus. By contrast, the blades communicate with each other using a computing connection 280. To that end, the computing connection 280 illustratively has a high-bandwidth, low-latency system interconnect, such as NumaLink, developed by Silicon Graphics International Corp. of Milpitas, Calif.

The chassis controller 260 provides system hardware management functions to the rest of the HPC system. For example, the chassis controller 260 may receive a system boot command from the SMN 220, and respond by issuing boot commands to each of the blades 262-266 using the local management bus 268. Similarly, the chassis controller 260 may receive hardware error data from one or more of the blades 262-266 and store this information for later analysis in combination with error data stored by the other chassis controllers. In some embodiments, such as that shown in FIG. 2, the SMN 220 or a customer computer 230 are provided access to a single, master chassis controller 260 that processes system management commands to control the HPC system 100 and forwards these commands to the other chassis controllers. In other embodiments, however, an SMN 220 is coupled directly to the management connection 270 and issues commands to each chassis controller individually. Persons having ordinary skill in the art may contemplate variations of these designs that permit the same type of functionality, but for clarity only these designs are presented.

The blade chassis 252, its blades 262-266, and the local management bus 268 may be provided as known in the art. However, the chassis controller 260 may be implemented using hardware, firmware, or software provided by the HPC system designer. Each blade provides the HPC system 100 with some quantity of processors, volatile memory, non-volatile storage, and I/O devices that are known in the art of standalone computer servers. However, each blade also has hardware, firmware, and/or software to allow these computing resources to be grouped together and treated collectively as computing partitions, as described below in more detail in the section entitled "System Operation."

While FIG. 2 shows an HPC system 100 having four chassis and three blades in each chassis, it should be appreciated that these figures do not limit the scope of the invention. An HPC system may have dozens of chassis and hundreds of blades; indeed, HPC systems often are desired because they provide very large quantities of tightly-coupled computing resources.

Figure 3:
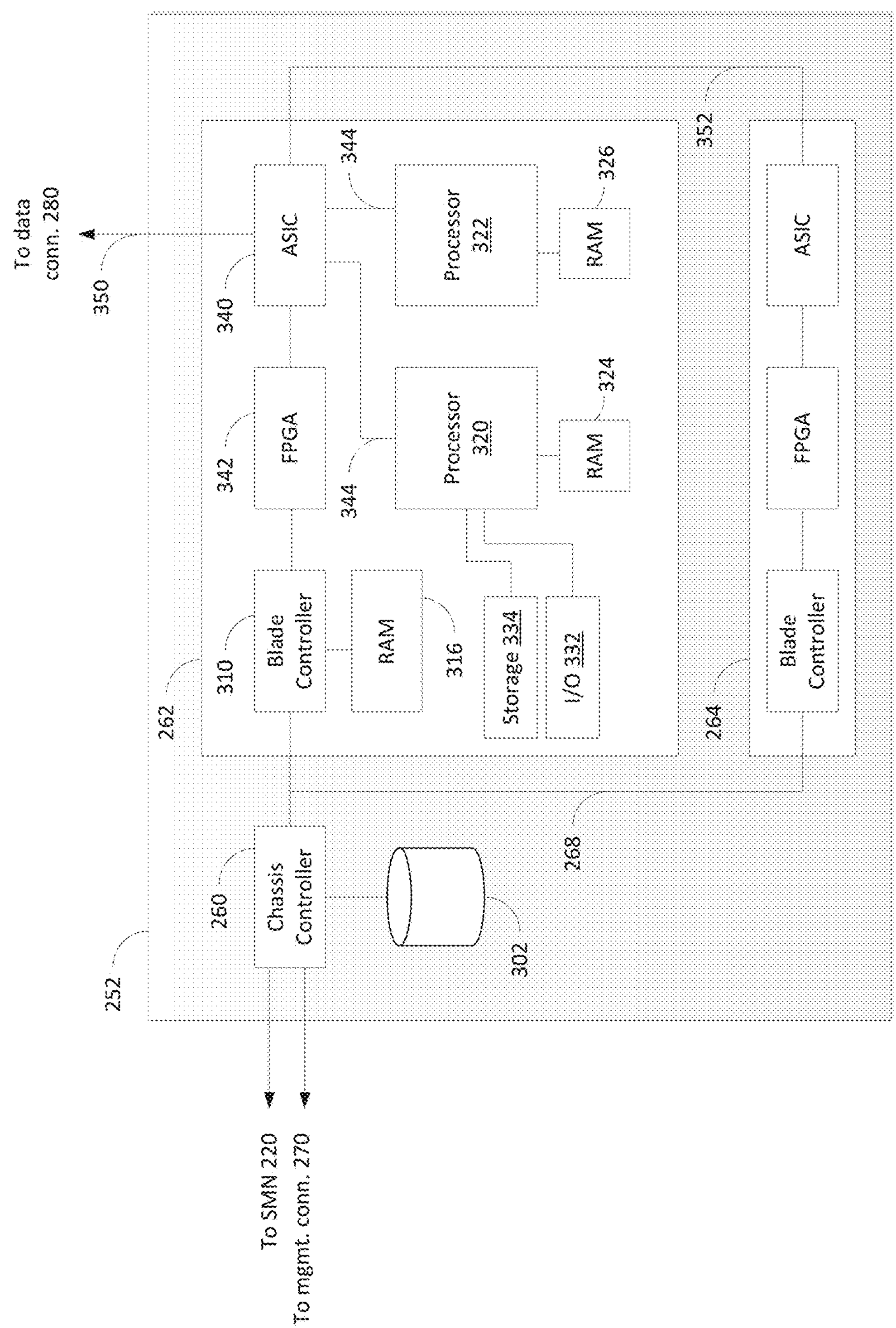
FIG. 3 schematically shows details of a blade chassis of the HPC system of FIG. 1.

FIG. 3 schematically shows a single blade chassis 252 in more detail. In this figure, parts not relevant to the immediate description have been omitted. The chassis controller 260 is shown with its connections to the system management node 220 and to the management connection 270. The chassis controller 260 may be provided with a chassis data store 302 for storing chassis management data. In some embodiments, the chassis data store 302 is volatile random access memory ("RAM"), in which case data in the chassis data store 302 are accessible by the SMN 220 so long as power is applied to the blade chassis 252, even if one or more of the computing partitions has failed (e.g., due to an OS crash) or a blade has malfunctioned. In other embodiments, the chassis data store 302 is non-volatile storage such as a hard disk drive ("HDD") or a solid state drive ("SSD"). In these embodiments, data in the chassis data store 302 are accessible after the HPC system has been powered down and rebooted.

FIG. 3 shows relevant portions of specific implementations of the blades 262 and 264 for discussion purposes. The blade 262 includes a blade management controller 310 (also called a "blade controller" or "BMC") that executes system management functions at a blade level, in a manner analogous to the functions performed by the chassis controller at the chassis level. For more detail on the operations of the chassis controller and blade controller, see the section entitled "HPC System Operation" below. The blade controller 310 may be implemented as custom hardware, designed by the HPC system designer to permit communication with the chassis controller 260. In addition, the blade controller 310 may have its own RAM 316 to carry out its management functions. The chassis controller 260 communicates with the blade controller of each blade using the local management bus 268, as shown in FIG. 3 and the previous figures.

The blade 262 also includes one or more microprocessors 320, 322 (alternatively referred to as "processors 320 or 322" or generically referred to as "processors 320") that are connected to RAM 324, 326. Blade 262 may be alternately configured so that multiple processors may access a common set of RAM on a single bus, as is known in the art. It should also be appreciated that processors 320, 322 may include any number of central processing units ("CPUs") or cores, as is known in the art. The processors 320, 322 in the blade 262 are connected to other items, such as a data bus that communicates with I/O devices 332, a data bus that communicates with non-volatile storage 334, and other buses commonly found in standalone computing systems. (For clarity, FIG. 3 shows only the connections from processor 320 to these other devices.) The processors 320, 322 may be, for example, Intel® Core™ processors manufactured by Intel Corporation. The I/O bus may be, for example, a PCI or PCI Express ("PCIe") bus. The storage bus may be, for example, a SATA, SCSI, or Fibre Channel bus. It will be appreciated that other bus standards, processor types, and processor manufacturers may be used in accordance with illustrative embodiments of the present invention.

Each blade (e.g., the blades 262 and 264) includes an application-specific integrated circuit 340 (also referred to as an "ASIC", "hub chip", or "hub ASIC") that controls much of its functionality. More specifically, to logically connect the processors 320, 322, RAM 324, 326, and other devices 332, 334 together to form a managed, multi-processor, (optionally) coherently-shared distributed-memory HPC system, the processors 320, 322 are electrically connected to the hub ASIC 340. The hub ASIC 340 thus provides an interface between the HPC system management functions generated by the SMN 220, chassis controller 260, and blade controller 310, and the computing resources of the blade 262.

In this connection, the hub ASIC 340 connects with the blade controller 310 either through a direct connection, or by way of a field-programmable gate array ("FPGA") 342 or similar programmable device for passing signals between integrated circuits. Those skilled in the art can select the appropriate connection between the hub ASIC 340 and the blade controller 310. Discussion of the direct connection or indirect connection should not limit various embodiments of the invention.

In particular, signals are generated on output pins of the blade controller 310, in response to commands issued by the chassis controller 260. In the indirect connection case, these signals are translated by the FPGA 342 into commands for certain input pins of the hub ASIC 340, and vice versa. For example, a "power on" signal received by the blade controller 310 from the chassis controller 260 requires, among other things, providing a "power on" voltage to a certain pin on the hub ASIC 340; the FPGA 342 facilitates this task.

The field-programmable nature of the FPGA 342 permits the interface between the blade controller 310 and ASIC 340 to be reprogrammable after manufacturing. Thus, for example, the blade controller 310 and ASIC 340 may be designed to have certain generic functions, and the FPGA 342 may be used advantageously to program the use of those functions in an application-specific way. The communications interface between the blade controller 310 and ASIC 340 also may be updated if a hardware design error is discovered in either module, permitting a quick system repair without requiring new hardware to be fabricated.

Also in connection with its role as the interface between computing resources and system management, the hub ASIC 340 is connected to the processors 320, 322 by way of a high-speed processor interconnect 344. In one embodiment, the processors 320, 322 are manufactured by Intel Corporation which provides the Intel® QuickPath Interconnect ("QPI") for this purpose, and the hub ASIC 340 includes a module for communicating with the processors 320, 322 using QPI. Other embodiments may use other processor interconnect configurations.

The hub chip 340 in each blade also provides connections to other blades for high-bandwidth, low-latency data communications. Thus, the hub chip 340 includes a link 350 to the computing connection 280 that connects different blade chassis. This link 350 may be implemented using networking cables, for example. The hub ASIC 340 also includes connections to other blades in the same blade chassis 252. The hub ASIC 340 of blade 262 connects to the hub ASIC 340 of blade 264 by way of a chassis computing connection 352. The chassis computing connection 352 may be implemented as a data bus on a backplane of the blade chassis 252 rather than using networking cables, advantageously allowing the very high speed data communication between blades that is required for high-performance computing tasks. Data communication on both the inter-chassis computing connection 280 and the intra-chassis computing connection 352 may be implemented using the NumaLink protocol or a similar protocol.

HPC System Operation

System management commands generally propagate from the SMN 220, through the management connection 270 to the blade chassis (and their chassis controllers), then to the blades (and their blade controllers), and finally to the hub ASICS that implement the commands using the system computing hardware.

As a concrete example, consider the process of powering on an HPC system. In accordance with exemplary embodiments, the HPC system 100 is powered when a system operator issues a "power on" command from the SMN 220. The SMN 220 propagates this command to each of the blade chassis 252-258 by way of their respective chassis controllers, such as chassis controller 260 in blade chassis 252. Each chassis controller, in turn, issues a "power on" command to each of the respective blades in its blade chassis by way of their respective blade controllers, such as blade controller 310 of blade 262. Blade controller 310 issues a "power on" command to its corresponding hub chip 340 using the FPGA 342, which provides a signal on one of the pins of the hub chip 340 that allows it to initialize. Other commands propagate similarly.

Once the HPC system is powered on, its computing resources may be divided into computing partitions. The quantity of computing resources that are allocated to each computing partition is an administrative decision. For example, a customer may have a number of projects to complete, and each project is projected to require a certain amount of computing resources. Different projects may require different proportions of processing power, memory, and I/O device usage, and different blades may have different quantities of the resources installed. The HPC system administrator takes these considerations into account when partitioning the computing resources of the HPC system 100. Partitioning the computing resources may be accomplished by programming each blade's RAM 316. For example, the SMN 220 may issue appropriate blade programming commands after reading a system configuration file.

The collective hardware computing resources of the HPC system 100 may be divided into computing partitions according to any administrative need. Thus, for example, a single computing partition may include the computing resources of some or all of the blades of one blade chassis 252, all of the blades of multiple blade chassis 252 and 254, some of the blades of one blade chassis 252 and all of the blades of blade chassis 254, all of the computing resources of the entire HPC system 100, and other similar combinations. Hardware computing resources may be partitioned statically, in which case a reboot of the entire HPC system 100 is required to reallocate hardware. Alternatively and preferentially, hardware computing resources are partitioned dynamically while the HPC system 100 is powered on. In this way, unallocated resources may be assigned to a partition without interrupting the operation of other partitions.

It should be noted that once the HPC system 100 has been appropriately partitioned, each partition may be considered to act as a standalone computing system. Thus, two or more partitions may be combined to form a logical computing group inside the HPC system 100. Such grouping may be necessary if, for example, a particular computational task is allocated more processors or memory than a single operating system can control. For example, if a single operating system can control only 64 processors, but a particular computational task requires the combined power of 256 processors, then four partitions may be allocated to the task in such a group. This grouping may be accomplished using techniques known in the art, such as installing the same software on each computing partition and providing the partitions with a VPN.

Once at least one partition has been created, the partition may be booted and its computing resources initialized. Each computing partition, such as partition 160, may be viewed logically as having a single OS 191 and a single BIOS 192. As is known in the art, BIOS is a collection of instructions that electrically probes and initializes the available hardware to a known state so that the OS can boot, and is typically provided in a firmware chip on each physical server. However, a single logical computing partition 160 may span several blades, or even several blade chassis. A blade may be referred to as a "computing node" or simply a "node" to emphasize its allocation to a particular partition.

Booting a partition in accordance with an embodiment of the invention requires a number of modifications to be made to a blade chassis that is purchased from stock. In particular, the BIOS in each blade are modified to determine other hardware resources in the same computing partition, not just those in the same blade or blade chassis. After a boot command has been issued by the SMN 220, the hub ASIC 340 eventually provides an appropriate signal to the processor 320 to begin the boot process using BIOS instructions. The BIOS instructions, in turn, obtain partition information from the hub ASIC 340 such as: an identification (node) number in the partition, a node interconnection topology, a list of devices that are present in other nodes in the partition, a master clock signal used by all nodes in the partition, and so on. Armed with this information, the processor 320 may take whatever steps are required to initialize the blade 262, including 1) non-HPC-specific steps such as initializing I/O devices 332 and non-volatile storage 334, and 2) also HPC-specific steps such as synchronizing a local hardware clock to a master clock signal, initializing HPC-specialized hardware in a given node, managing a memory directory that includes information about which other nodes in the partition have accessed its RAM, and preparing a partition-wide physical memory map.

At this point, each physical BIOS has its own view of the partition, and all of the computing resources in each node are prepared for the OS to load. The BIOS then reads the OS image and executes it, in accordance with techniques known in the art of multiprocessor systems. The BIOS presents to the OS a view of the partition hardware as if it were all present in a single, very large computing device, even if the hardware itself is scattered among multiple blade chassis and blades. In this way, a single OS instance spreads itself across some, or preferably all, of the blade chassis and blades that are assigned to its partition. Different operating systems may be installed on the various partitions. If an OS image is not present, for example immediately after a partition is created, the OS image may be installed using processes known in the art before the partition boots.

Once the OS is safely executing, its partition may be operated as a single logical computing device. Software for carrying out desired computations may be installed to the various partitions by the HPC system operator. Users may then log into the SMN 220. Access to their respective partitions from the SMN 220 may be controlled using volume mounting and directory permissions based on login credentials, for example. The system operator may monitor the health of each partition, and take remedial steps when a hardware or software error is detected. The current state of long-running application programs may be saved to non-volatile storage, either periodically or on the command of the system operator or application user, to guard against losing work in the event of a system or application crash. The system operator or a system user may issue a command to shut down application software. Other operations of an HPC partition may be known to a person having ordinary skill in the art. When administratively required, the system operator may shut down a computing partition entirely, reallocate or deallocate computing resources in a partition, or power down the entire HPC system 100.

Packet-Based Adaptive Forward Error Correction

As discussed above, various embodiments of the invention provide packet-based adaptive forward error correction. Generally speaking, the logic of each embodiment operates in the transmitter, rather than the receiver. The transmitter sends each packet of data using FEC, with a varying "level" or number of correctable bits. The transmitter determines a "packet error rate", analogous to the bit error rate known in the art, and adjusts the FEC level accordingly. Thus, if the packet error rate is too high, the FEC level is increased so the receiver can decode more packets. However, if the FEC level remains high but the packet error rate drops, then bandwidth is being wasted by unnecessary FEC overhead, so the FEC level is decreased. As these balancing processes occur continuously, the FEC level is dynamically adapted to the condition of the communication medium. It should be appreciated that the packet-based adaptive forward error correction disclosed herein may be used between any two devices that communicate packets over a lossy bidirectional communication medium. For the sake of concreteness, an embodiment in an HPC system is now described.

In one embodiment, packet-based adaptive forward error correction is performed between two ASICs of the HPC system of FIGS. 1 to 3. The two ASICs may be connected via an inter-chassis data connection 350 or by an intra-chassis data connection 352. As the ASICs exchange data, an ASIC that transmits data on which forward error correction is performed is designated the "transmitting ASIC", and the ASIC that attempts to correct errors in those data is designated the "receiving ASIC". Thus, for two ASICs connected by a single bidirectional communication medium, each ASIC is the transmitting ASIC for packets it sends to the other, and the receiving ASIC for packets it receives from the other.

In accordance with this embodiment, each transmitting ASIC is configured to apply a forward error correction algorithm to a sequence of data packets. The data packets may include data used by the application software 193, or by the operating system instance 191, or by the ASICs 340 themselves. Regardless the source of the packets, the transmitting ASIC applies forward error correction to each data packet. The forward error correction algorithm defines a variable level N, which equals the number of correctable bits.

Once each packet has been formatted according to the forward error correction algorithm, the transmitting ASIC forwards the formatted packet to the receiving ASIC using the data communication medium, and the transmitting ASIC waits for another data packet. When each packet arrives at the receiving ASIC, it may have zero or more bit errors. If the number of bit errors is less than or equal to N, the receiving ASIC can correct the errors, and the data were successfully received. If the number of bit errors is greater than N, the receiving ASIC cannot correct the errors, and must request retransmission of the packet from the transmitting ASIC. A "packet error rate" can be defined as the number of such retry requests per unit time.

Advantageously, the transmitting ASIC adapts the forward error correction level N as a function of the packet error rate. In particular, if the packet error rate is very high, then the transmitting ASIC increases the FEC level, while if the packet error rate is very low, then the transmitting ASIC decreases the FEC level. To effectively compute the packet error rate, the transmitting ASIC in the embodiment uses two stored values: a retry count and a retry timer.

Figure 4:
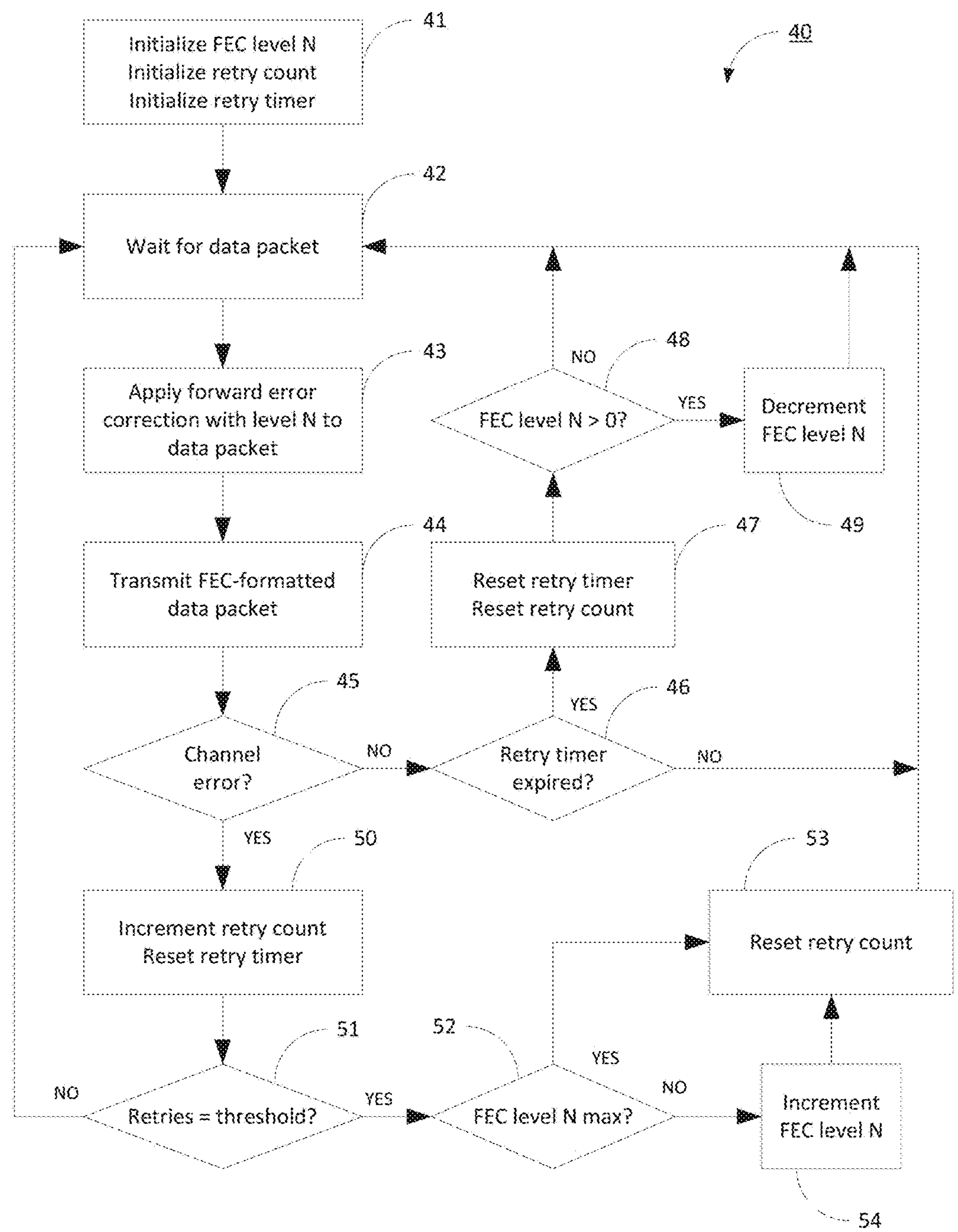
FIG. 4 is a flowchart showing details of a method of providing packet-based adaptive forward error correction over a lossy bidirectional data communication medium by a transmitting device.

These features of an embodiment of the invention are further explained in connection with FIGS. 4 and 5. FIG. 4 is a flowchart showing details of a method 40 of providing packet-based adaptive forward error correction (FEC) over a lossy bidirectional data communication medium by a transmitting device. The method begins with an initialization process 41. In process 41, the transmitting ASIC initializes the FEC level N to a starting value. If the communication channel is relatively error-free, this value may be zero so that no FEC is performed at first. Also in process 41, the retry count and retry timer are initialized.

In process 42, the transmitting ASIC waits for a data packet as described above. In process 43, the transmitting ASIC adds redundant information to the data packet to form an FEC-encoded data packet, where the redundant information allows the receiving ASIC to correct up to N bit errors. The process 43 will vary depending upon the particular forward error correction algorithm chosen, but each such algorithm provides a process for determining the appropriate redundant data. It should be appreciated that additional processing may be performed to the FEC-encoded data packet at this time, including the addition of non-correctable data to the payload, the addition of a packet header that specifies the level N, or the addition of a cyclic redundancy code (CRC) for the benefit of the receiving ASIC; FIG. 4 shows only the processes relevant to an embodiment of the invention. In process 44, the transmitting ASIC transmits the FEC-encoded data packet toward the receiving ASIC. Transmission of data packets may be performed by processes known in the art. To this point, the method 40 has transmitted a data packet protected by FEC, as known in the art.

The adaptive nature of the method 40 begins with process 45, wherein the method adaptively determines the FEC level N for transmission of subsequent data packets. The primary indication of channel errors in accordance with the embodiment is the receipt by the transmitting ASIC of retry requests from the receiving ASIC. Therefore, in process 45, the transmitting ASIC determines whether a retry request has been received. Reception of retry requests may be performed by processes known in the art. However, in an alternate embodiment that uses a packet acknowledgement protocol, channel errors may be indicated by non-reception of a retry request, when the transmitting ASIC determines that no acknowledgement of the FEC-encoded data packet was received according to the protocol.

If no retry request was received, then it is possible that the communication channel has become less error-prone. The illustrated embodiment assumes that if no retry requests at all were received during a given duration, then the FEC level N can be decreased. To keep track of the passage of time, the transmitting ASIC maintains a retry timer. Therefore, in process 46, the transmitting ASIC determines whether the retry timer has expired; that is, whether the timer has reached the given duration. If not, then it is possible that the given duration has not yet elapsed, and a retry request could still be received, so the method 40 returns to process 42.

However, if the retry timer has expired, then the FEC level N should be decreased if possible. Thus, in process 47, the retry timer is reset. Also in process 47, the retry count is reset, in case the given duration without a retry request occurred after a period of rapid requests (as described below in more detail). Then, in process 48, the transmitting ASIC determines whether the FEC level N can be decreased, which occurs precisely when it is a positive number. If it can be decreased, then it is decremented in process 49. That is to say, the transmitting ASIC determines to use, for subsequent FEC encoding, a FEC algorithm that uses a smaller value for the level N. In either case, the FEC algorithm has been dynamically adapted to the communication channel, and the method 40 returns to process 42.

If process 45 determines that a retry request was received, then it is possible that the communication channel has become more error-prone. The illustrated embodiment assumes that if a given threshold number of requests are received, each within the given duration after the previous such request, then the communication channel is too error-prone and the FEC level N must be increased. Therefore, in process 50, the transmitting ASIC increments the retry counter to remember the currently received retry request, and resets the retry timer in anticipation of receiving the next such request within the given duration. Then, in process 51, the transmitting ASIC determines whether the number of received retries, as remembered by the retry counter, equals the given threshold. If not, then the embodiment has not yet determined that the FEC level N must be increased, and the method 40 returns to process 42.

However, if the number of received retries equals the threshold, then the FEC level N must be increased if possible. To accomplish this, in process 52 the transmitting ASIC determines whether the FEC level N can be increased. This may not always be the case, as it is possible that there is a maximum level N, for example due to implementation constraints within the transmitting ASIC. If the level cannot be increased, the method proceeds to process 53, in which the transmitting ASIC resets the retry count. However, if the FEC level N can be increased, the transmitting ASIC increments it in process 54. That is, the transmitting ASIC determines to use, for subsequent FEC encoding, an FEC algorithm having an increased level N. The transmitting ASIC proceeds to reset the retry count in process 53 in anticipation of having to increase the FEC level N yet again. After the retry count has been reset, the FEC algorithm has been dynamically adapted to the communication channel, and the method 40 returns to process 42.

It should be appreciated that the transmitting ASIC may perform additional processing if a retry request is received, including retransmitting the packet for which the request was sent by the receiving ASIC; FIG. 4 shows only the processes relevant to an embodiment of the invention.

The processing that is done by the receiving ASIC is much simpler. FIG. 5 is a flowchart showing details of a method 60 of providing packet-based adaptive forward error correction over a lossy bidirectional data communication medium by a receiving device. The method 60 begins with process 61, in which the receiving ASIC waits to receive an FEC-encoded data packet sent by the transmitting ASIC using the communications medium in process 44. Reception of data packets may be performed by processes known in the art.

Once a data packet is received, in process 62 the receiving ASIC attempts to correct errors in the FEC-encoded data packet. The process 62 will vary depending upon the particular forward error correction algorithm chosen, but each such algorithm provides a process for correcting errors. The process 62 also may rely on a FEC level N that is determined by consulting a header of the data packet.

In process 63, the receiving ASIC determines whether all errors were corrected; that is, whether the decoding process 62 completed successfully. If so, then the method 60 continues to process 64, in which the receiving ASIC processes the corrected data packet. Such processing may include forwarding the corrected data to application software 193, or to the operating system instance 191, or to another ASIC 340 as the case may be. However, if the data packet included uncorrectable errors despite the presence of forward error correction, then in process 65 the receiving ASIC sends a request to the transmitting ASIC to retransmit the uncorrectable data packet. Transmission of retry requests may be performed by processes known in the art, and such a request may include, for example, a sequence number of the uncorrectable data packet.

Illustrative embodiments of the invention determine whether to increase or decrease a forward error correction level based on a retry timer that lasts for a given duration, and a retry count that increases until it reaches a given threshold. Clearly, the choice of the duration and threshold affect adaptation performance. The given duration represents the length of time during which completely error-free data transmission results in a decrease of FEC level, and should be set to a realistic value based on the particular communication medium in use. Once the packet error rate exceeds, on average, one packet in the given duration, the transmitting ASIC will begin to receive a sequence of retry requests, each such request coming less than the given duration after the previous one. Eventually, such a sequence will trigger an increase of FEC level. The given threshold multiplied by the given duration therefore represents the maximum amount of time that the transmitting ASIC must wait to determine whether to increase or decrease the FEC level.

In some embodiments of the invention, the transmitting ASIC may keep track of the FEC level as it varies over time. Such embodiments may provide predictive information about the communication medium. For example, if the transmitting ASIC determines that the average FEC level is increasing over time, the communication medium may be degrading and need replacement.

In some embodiments of the invention, the given duration and given threshold are set once upon system initialization, then remain unaltered during the methods 40 and 60. However, in other embodiments, these parameters may themselves be dynamically adapted. One consideration that may drive how the parameters are adapted is the desire to maximize bandwidth. The amount of redundant data provided by an FEC algorithm generally increases as the level N of correctable bit errors increases. Moreover, this redundant data is present in each data packet transmitted by the transmitting ASIC, decreasing the maximum theoretical available bandwidth for data. However, if the FEC algorithm is efficient, the redundant data that accompanies each data packet are usually a small percentage of the total size of the data packet, while retransmission of an entire data packet uses much more data. There is a balance between the FEC level and the number of retry requests. Thus, in one embodiment, the transmitting ASIC determines the given duration, the given threshold, or both so that a number of bits per second to be subsequently transmitted as a result of adding forward error correction to each data packet is less than or equal to a number of bits per second of packets to be retransmitted in response to receiving requests to retransmit.

Figure 5:
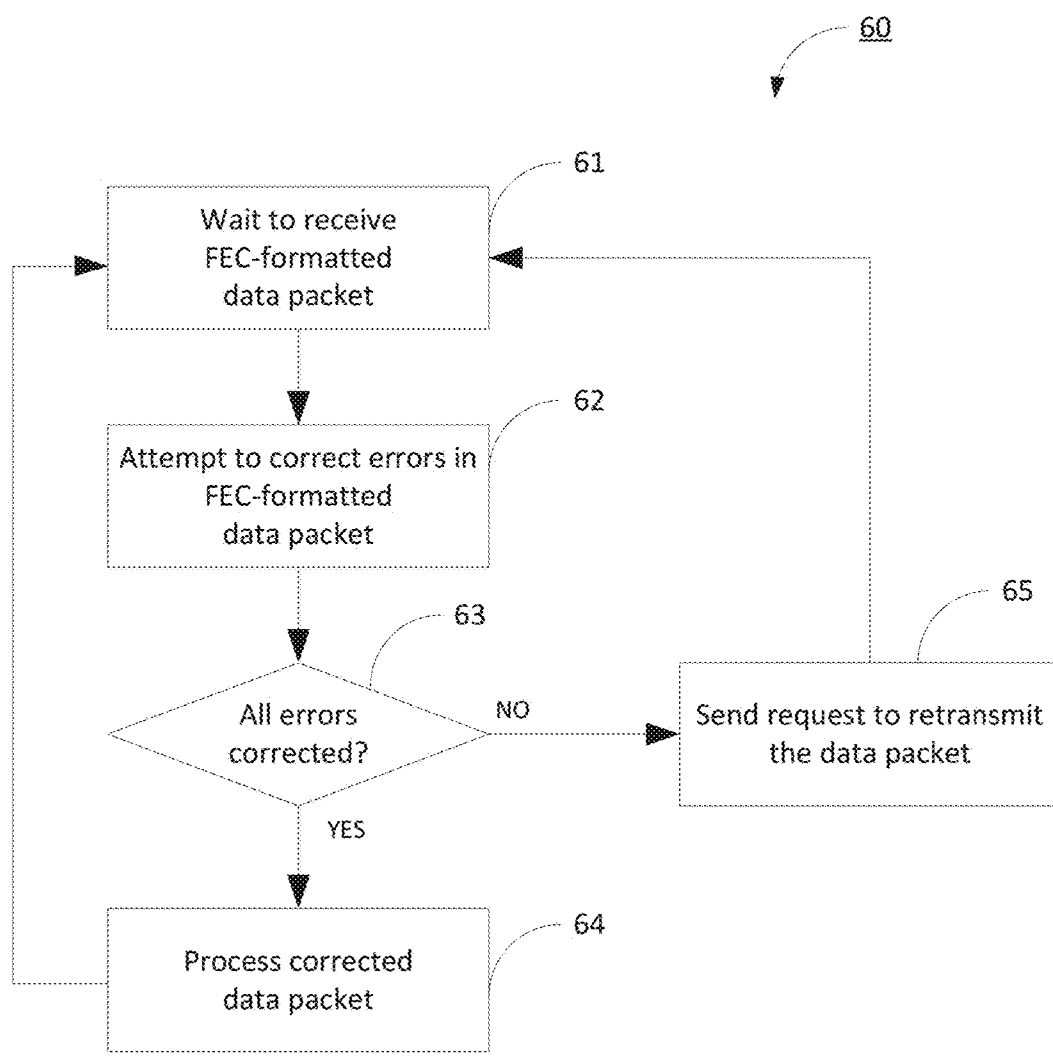
FIG. 5 is a flowchart showing details of a method of providing packet-based adaptive forward error correction over a lossy bidirectional data communication medium by a receiving device.

Another consideration that may drive how the given duration and given threshold are determined is "level flipping." After a period of time equal to the given duration multiplied by the given threshold, the embodiment of FIGS. 4 and 5 will have either increased or decreased the FEC level. If the given threshold is too low, this period may be very short, and the FEC level may rapidly alternate between two values. In this case, the transmitting ASIC of one embodiment of the invention alters the given duration, the given threshold, or both to prevent such flipping.

On communications channels that do not perform retransmission of packets when errors are detected, other metrics can be used to ascertain the current level of reliability of the channel. These metrics may include decode errors, parity errors, synchronization errors, CRC errors and feedback from upper level protocol layers of detected errors. In embodiments that use such communications channels, process 65 of FIG. 5 may be replaced by a process that sends indications of such detected errors from the receiving ASIC to the transmitting ASIC. In such embodiments, process 45 of FIG. 4 is replaced by a process that determines whether such a more general indication has been received.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A system for providing packet-based adaptive forward error correction, the system comprising:

a data communication medium;

a transmitting device coupled to the data communication medium; and a receiving device, coupled to the data communication medium;

wherein the transmitting device is configured to repeatedly:

apply, to unencoded data, a forward error correction (FEC) algorithm having a level N that indicates a number of correctable errors, to thereby form an encoded data packet;

transmit the encoded data packet toward the receiving device using the data communication medium;

determine to use, for subsequent application to unencoded data, an FEC algorithm having a decreased level N, when the transmitting device does not receive a request to retransmit a previously transmitted encoded data packet within a given duration from the receiving device using the data communication medium; and determine to use, for subsequent application to unencoded data, an FEC algorithm having an increased level N, when the transmitting device receives a sequence of requests to retransmit previously transmitted encoded data packets, each request in the sequence being received less than the given duration after the previous request in the sequence, the sequence having a length that exceeds a given threshold length; and wherein the receiving device is configured to repeatedly:

receive the encoded data packet, from the transmitting device using the data communication medium;

when the encoded data packet contains no more than N errors, recover the unencoded data by applying the FEC algorithm to the received, encoded data packet; and when the encoded data packet contains more than N errors, send a request to retransmit the packet, toward the transmitting device using the data communication medium, wherein the transmitting device comprises a first computing node in a computing system, the receiving device comprises a second computing node in the computing system, and the first computing node and the second computing node are configured to cooperate to perform a computation by communicating packets of data using the data communication medium.

2. The system according to claim 1, wherein the computing system is a high performance computing system.

3. The system according to claim 1, wherein the transmitting device is further configured to specify the level N in a header of each encoded data packet.

4. The system according to claim 1, wherein the level N has a minimum of zero and has a given maximum.

5. The system according to claim 1, wherein the transmitting device is further configured to retransmit the encoded data packet in response to receiving the request to retransmit the encoded data packet.

6. The system according to claim 1, wherein the transmitting device is further configured to determine the given duration, the given threshold, or both, so that a number of bits per second of encoded data packets to be transmitted using the FEC algorithm is less than or equal to a number of bits per second of packets to be retransmitted in response to receiving requests to retransmit such encoded data packets using the FEC algorithm.

7. The system according to claim 1, wherein the transmitting device is further configured to alter the given duration, the given threshold, or both, when the transmitting device is alternating by more than an alternating threshold between using two FEC algorithms having different levels.

8. A method of providing packet-based adaptive forward error correction over a lossy bidirectional data communication medium that couples a transmitting device to a receiving device, the method comprising repeatedly:

transmitting, by the transmitting device toward the receiving device using the data communication medium for subsequent decoding by the receiving device, an encoded data packet formed by applying, to unencoded data, a forward error correction (FEC) algorithm having a level N that indicates a number of correctable errors;

determining to use, by the transmitting device for subsequent application to unencoded data, an FEC algorithm having a decreased level N, when the transmitting device does not receive, within a given duration from the receiving device using the data communication medium, a request to retransmit a previously transmitted encoded data packet; and determining to use, by the transmitting device for subsequent application to unencoded data, an FEC algorithm having an increased level N, when the transmitting device receives a sequence of requests to retransmit previously transmitted packets, each request in the sequence being received less than the given duration after the previous request in the sequence, the sequence having a length that exceeds a given threshold, wherein the transmitting device comprises a first computing node in a computing system, the receiving device comprises a second computing node in the computing system, and the first computing node and the second computing node are configured to cooperate to perform a computation by communicating packets of data using the data communication medium.

9. The method according to claim 8, wherein the computing system is a high performance computing system.

10. The method according to claim 8, wherein transmitting includes specifying the level N in a header of each encoded data packet.

11. The method according to claim 8, wherein the level N has a minimum of zero and has a given maximum.

12. The method according to claim 8, further comprising the transmitting device retransmitting the previously transmitted encoded data packet in response to receiving the request to retransmit the encoded data packet.

13. The method according to claim 8, further comprising the transmitting device determining the given duration, the given threshold, or both, so that a number of bits per second of encoded data packets to be transmitted using the FEC algorithm is less than or equal to a number of bits per second of packets to be retransmitted in response to receiving requests to retransmit such encoded data packets using the FEC algorithm.

14. The method according to claim 8, further comprising the transmitting device altering the given duration, the given threshold, or both, when the transmitting device is alternating by more than an alternating threshold between using two FEC algorithms having different levels.

15. A tangible storage medium in which is non-transitorily stored program code that, when executed by a transmitting device, causes the transmitting device to perform a method of packet-based adaptive forward error correction over a lossy bidirectional data communication medium that couples the transmitting device to a receiving device, the method comprising repeatedly:

transmitting, by the transmitting device toward the receiving device using the data communication medium for subsequent decoding by the receiving device, an encoded data packet formed by applying, to unencoded data, a forward error correction (FEC) algorithm having a level N that indicates a number of correctable errors;

determining to use, by the transmitting device for subsequent application to unencoded data, an FEC algorithm having a decreased level N, when the transmitting device does not receive, within a given duration from the receiving device using the data communication medium, a request to retransmit a previously transmitted encoded data packet; and determining to use, by the transmitting device for subsequent application to unencoded data, an FEC algorithm having an increased level N, when the transmitting device receives a sequence of requests to retransmit previously transmitted packets, each request in the sequence being received less than the given duration after the previous request in the sequence, the sequence having a length that exceeds a given threshold, wherein the transmitting device comprises a first computing node in a computing system, the receiving device comprises a second computing node in the computing system, and the first computing node and the second computing node are configured to cooperate to perform a computation by communicating packets of data using the data communication medium.

16. The storage medium according to claim 15, wherein the computing system is a high performance computing system.

17. The storage medium according to claim 15, wherein the program code for transmitting includes program code for specifying the level N in a header of each encoded data packet.

18. The storage medium according to claim 15, wherein the level N has a minimum of zero and has a given maximum.

19. The storage medium according to claim 15, further comprising program code for retransmitting the previously transmitted encoded data packet in response to receiving the request to retransmit the encoded data packet.

20. The storage medium according to claim 15, further comprising program code for determining the given duration, the given threshold, or both so that a number of bits per second of encoded data packets to be transmitted using the FEC algorithm is less than or equal to a number of bits per second of packets to be retransmitted in response to receiving requests to retransmit such encoded data packets using the FEC algorithm.

21. The storage medium according to claim 15, further comprising program code for altering the given duration, the given threshold, or both, when the transmitting device is alternating by more than an alternating threshold between using two FEC algorithms having different levels.

* * * * *